March 21, 1961 H. W. RIMBACH ET AL 2,976,249
METHOD FOR PREPARING CALCIUM HALOPHOSPHATE PHOSPHORS
Filed Aug. 29, 1956
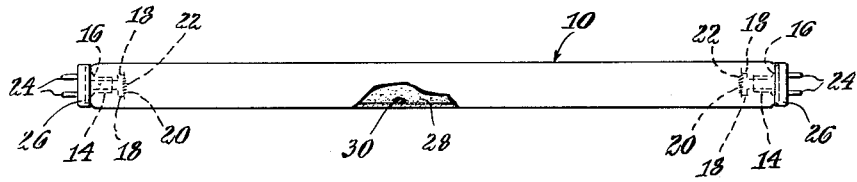
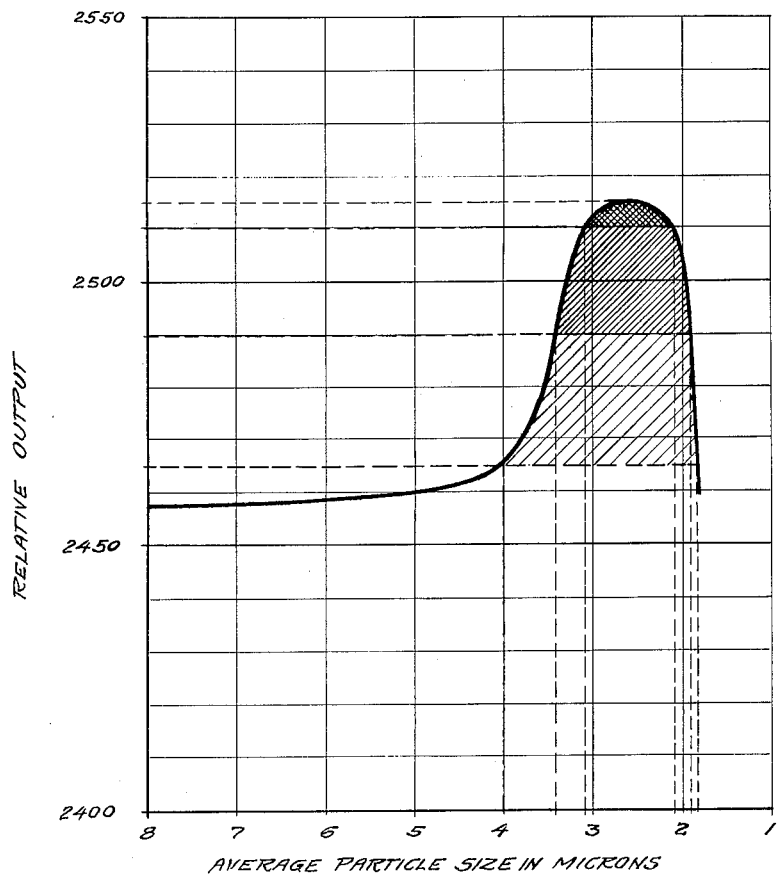
INVENTORS
HENRY W. RIMBACH and
JACOB VAN BROEKHOVEN.
BY United States Patent Office 2,976,249
Patented Mar. 21, 1961

2,976,249
METHOD FOR PREPARING CALCIUM HALOPHOSPHATE PHOSPHORS

Henry W. Rimbach, Bloomfield, and Jacob Van Broekhoven, Passaic, N.J., assignors to Westinghouse Electric Corporation, East Pittsburgh, Pa., a corporation of Pennsylvania Filed Aug. 29, 1956, Ser. No. 606,888

13 Claims. (Cl. 252—301.4)

This invention relates to fluorescent lamps and halophosphate phosphor materials therefor and, more particularly, to a method for preparing halophosphate phosphor materials and to the resulting product, and this application is a continuation-in-part of application Serial No. 598,090, filed July 16, 1956, now abandoned, titled "Halophosphate Phosphors and Method," by Rimbach and Van Broekhoven, the inventors herein, and owned by the present assignee.

Halophosphate phosphor materials for fluorescent lamps are well known and are described in U.S. Patent No. 2,488,733 to McKeag and Ranby. These halophosphate materials are generally analogous to the natural mineral apatite and will display substantially the same X-ray diffraction pattern as this mineral. Briefly these halophosphate materials may be represented by the matrix $$3M_3(PO_4)_2 \cdot 1M'L_2$$

where L represents a halogen or mixture of halogens and M and M' represent either different or identical bivalent metals or mixtures of such metals. In practice, the primary constituent for most halo-phosphate phosphor is calcium orthophosphate although strontium orthophosphate is used in some limited cases. The halide constituent normally comprises calcium chloride or fluoride or strontium chloride or fluoride or mixtures of both and the activator materials are normally antimony or antimony plus manganese.

In preparing halophosphate phosphor materials, the raw-mix constituents are thoroughly mixed or blended and then fired, preferably in covered crucibles, at temperatures which may vary, for example, between about 1100° C. to about 1260° C., with the maximum firing temperature being determined by the hardness of the resulting fired batch. It should be noted that it is normally desirable to fire the raw-mix constituents at as high a temperaure as permissible which will still enable the phosphor material to be reduced readily to a finely-divided state after firing in order that it may be coated onto the envelope of a fluorescent lamp. If the firing temperatures are excessive, the resulting material will be excessively hard and cannot readily be reduced to a finely-divided status. This will require excessive grinding or reducing to attain a finely-divided state and the output of the phosphor will be decreased by this excessive grinding. Determination of optimum firing temperatures and times, for a single-firing technique, as relating to phosphor hardness, etc., are primarily a matter of experimentation and such procedures are well known in the art. It should be noted that the minimum firing temperature for the raw-mix constituents is governed by formation of the phosphor matrix by the raw-mix constituents and by achieving maximum possible output from the resulting phosphor material.

It is also known that if the fired-phosphor constituents are reground and then refired, their output is sometimes enhanced. The best procedures of the prior art have been first to fire the phosphor raw-mix constituents at a temperature and for a length of time which is consistent with producing what may be termed a friable cake of phosphor material. A friable cake of phosphor material may be defined as a reacted mass of phosphor material having a configuration which is self sustaining, at least within the firing crucible which was used to form the cake. That is, the crucible can be tipped or rocked and the cake will maintain its configuration. However, the cake can still be readily reduced to a finely-divided status by reducing means such a hammer mill.

Per the best-known practices of the prior art, this first-fired friable cake of phosphor material has then been reduced to a finely-divided status by hammer milling, for example, or by other milling procedure which will reduce the first-fired phosphor material to an average particle size of about seven microns. Ball or pebble milling the first-fired cake of phosphor material for a period of about an hour, for example, normally will effect an average particle size similar to that achieved by the hammer mill. The hammer-milled reduced phosphor material has then been refired to produce again a friable cake of phosphor. This phosphor has then been incorporated into a so-called "paint" and coated onto the interior of a fluorescent lamp envelope, by well-known techniques.

In the usual practices of both the prior art and this invention, the formation of a friable cake of phosphor material on firing is indicative that a maximum of fluorescent response under 2537 A.U. excitation has been achieved.

The fluorescent lamp art is highly competitive and a lamp which has an output of 1 or 2 lumens per watt greater than a competitive lamp will normally be sold over the competitive lamp. The art has placed much stress on output and efficiency and any improvement which will result in an appreciable increase in output and efficiency has a great affect in promoting one lamp over another competitive lamp. It should be noted that in the United States the great majority of the phosphor materials which are used in fluorescent lamps are of the halo-phosphate type, since these phosphor materials are not considered toxic, as are some other limited types of phosphor. Also, the materials comprising the halophosphate phosphor are relatively cheap and the halophosphate phosphor performance characteristics with regard to handling, efficiency and maintenance are excellent.

It is the general object of the invention to provide a method for preparing a halophosphate phosphor material wherein the output is appreciably improved.

It is a further object of the invention to provide optimum and permissible process variations for preparing improved halophosphate phosphor materials which have improved efficiency and output.

It is another object to provide improved halophosphate phosphor materials which have been prepared by an improved method.

The aforesaid objects of the invention and other objects which will become apparent as the description proceeds, are achieved by providing what may be termed a firing, milling and refiring procedure for preparing halophosphate phosphor materials wherein the first-fired phosphor material is reduced to a critical average particle size and thereafter refired in order to obtain a maximum of efficiency and output.

For a better understanding of the invention reference should be had to the accompanying drawing wherein:

Fig. 1 is an elevational view, partly in section, of a fluorescent lamp embodying the improved halophosphate phosphor material of this invention;

Fig. 2 is a graph of lamp brightness for the finished lamp vs. average particle size for the reduced phosphor material, after the first firing and before the phosphor material is refired.

The most common type of fluorescent lamp is the 40 watt type and the lamp illustrated is this type of lamp. It should be understood, however, that the improved halophosphate phosphor materials of this invention may be used in any size or type of fluorescent lamp.

With specific reference to the form of the invention illustrated in the drawing, the numeral 10 in Fig. 1 indicates generally a 40 W. T12 size fluorescent lamp comprising a tubular vitreous envelope 12 which may be fabricated of soda-lime-silica glass, for example, having mounts 14 sealed into either end thereof, as is customary. Each mount comprises a vitreous portion 16 sealed to the end of the envelope 12 with lead conductors 18 sealed therethrough and supporting, at their inwardly extending extremities, refractory metal coils 20, which may be fabricated of tungsten, for example. These coils are normally of a coiled-coil construction or of a triple-coil construction, such constructions being well known, and contained within the turns of the inner coil or coils is a filling of electron-emitting material 22. Such electron-emitting materials are well known and normally comprise a mixture of alkaline-earth oxides which may have some other material such as zirconia added thereto. As a specific example, the electron-emiting material may comprise a mixture of 60% by weight barium oxide, 30% by weight calcium oxide and 10% by weight strontium oxide and the electron-emitting material may have an additive such as 0.9% by weight of zirconia, if desired. This specific electron-emitting material is only given by way of example and many other mixtures of alkaline-earth materials or even single alkaline-earth materials may be used if desired, as is well known.

Electrical connections for the lead conductors 18 is normally effected by contact pins 24 which project from supporting base caps 26 at either end of the lamp. The envelope 12 has coated on its interior surface a phosphor material 28, which in accordance with this invention is a halophosphate phosphor material prepared by the improved method described herein. The envelope also contains a small filling of argon or other inert ionizable gas, at a pressure of about 4 mm. for example, in order to facilitate starting, although other starting gas fills at various pressures may be used if desired. Also contained within the envelope is a small charge of mercury 30, as is customary.

In preparing the phosphor materials in accordance with the method disclosed herein, the batch materials are first thoroughly mixed and are then fired in a covered crucible at a temperature of from about 1100° C. to about 1260° C. The precise firing temperatures and firing times are so selected as to react the raw-mix constituents to form the phosphor matrix and also to form a friable cake of phosphor material, that is, a cake of phosphor material which can be readily reduced to a powder form, which phosphor will have a maximum of 2537 A.U. response. The precise temperature selected within this firing range will depend upon the individual halophosphate phosphor material which is being formed; too low a firing temperature will not substantially react the raw-mix constituents for best lamp performance and too high a firing temperature will form a cake of phosphor material which cannot readily be reduced to powder form. It should be noted that under special conditions, even the foregoing range of firing temperatures can be extended, although under usual practices, the firing temperatures will fall within this range. After the first firing, the friable cake of reacted phosphor components preferably is reduced to an average particle size of about seven microns in order to shorten the total milling time, although the average particle size of the phosphor material after this first reduction is not particularly critical. As a specific example, this first reduction of the phosphor material may be effected in a hammer mill. The reduced phosphor materials are then placed in a pebble mill and are milled to an average particle size of from 1.8 to 4.0 microns, and preferably to an average particle size of from 1.9 to 3.4 microns. For optimum results, the average particle size after milling is from 2.1 to 3.1 microns. The milled phosphor is then placed in a covered crucible and refired so that it again forms a friable cake. The firing temperature for the second firing will normally be slightly less than the firing temperature for the first firing and it has been found that the firing temperature of the second firing will normally be from about 10° C. to about 80° C. less than the firing temperature for the first firing if optimum output is to be achieved, although the exact second firing temperature is not particularly critical. Apparently this lower second firing temperature is indicated by the fact that none of the phosphor constituents appear to be changing or combining chemically to any appreciable degree and there are only limited volatiles, which allows the finely-divided phosphor material to form into a friable cake at a lower temperature. In practice it has been found that the second firing temperature will fall with the range of from about 1050° C. to about 1200° C., although even this range may be extended under special conditions. This second-fired phosphor material is then incorporated into a "paint" so that it may be applied to the envelope of a fluorescent lamp. Such paint-forming techniques are well known and are spelled out in detail in the specific examples given hereinafter.

As a specific example of the foregoing firing-milling-refiring method for producing a halophosphate phosphor material, the following raw-mix constituents may be mixed in the following proportions:

*Example 1*

| Constituent: | Grams |
| --- | --- |
| CaO | 583 |
| $P_2O_5$ | 538 |
| Mn (added as manganous carbonate) | 10.17 |
| $Sb_2O_3$ | 31.0 |
| $SrCl_2$ | 48.0 |
| $CaF_2$ | 77.3 |

NOTE: In the foregoing example, the metal to phosphorous molar ratio may vary from 4.65 to 4.92 to 3. The halide to phosphorous ratio may vary from 1.02/6 to 1.23/6. The chlorine to fluorine ratio may vary from 1 mole chlorine to 6 moles fluorine to 1 to 1. The antimony may vary from about 1% to about 4% by weight of the phosphor and the manganese may vary from about 0.7% to about 0.9% by weight of the phosphor.

The foregoing raw-mix constituents are thoroughly mixed or blended as by means of a pebble mill, for example. These mixed raw-mix constituents are then fired in a covered crucible at a temperature of 1185° C. for a period of 3 hours, although the firing temperatures may vary from 1140° C. to 1195° C., for example, the higher the firing temperature, the shorter the firing time. Also, the firing time will vary with the batch size and depth of material in the crucible.

This will form a friable cake of phosphor material which may be reduced readily by hammer mill for example, to an average particle size of about 7 microns. These finely-divided materials are then placed in a pebble mill and milled for about 7 hours which will produce an average particle size of about 3.0 microns, for example. The milling time may vary considerably however, depending on the milling conditions and milling times as long as 24 hours have been used. Of course, if the mill charge of phosphor were very small, the milling time could be shortened considerably, although this is not practical from a commercial basis, if carried to extremes. It should be understood that all of the foregoing phosphor particle reduction may be effected in the pebble mill if desired, but it is desirable from the time standpoint first to reduce the phosphor in a hammer mill and then pebble mill same for a very extended period. The milled phosphor material is then refired in a covered crucible at a temperature of about 1120° C. for 2½ hours, for example, which again will form a friable cake of phosphor material. The firing time may vary considerably, as noted above. The temperature of this second firing may vary from 1100° C. to 1130° C., for example, the higher the firing temperature, the shorter the firing time. As hereinbefore indicated, the upper temperature limitations for any specific example of a halophosphate phosphor material are intended to keep the phosphor material from being too hard and the lower temperature limitations are required to react substantially completely the phosphor materials in order to achieve a maximum output. The foregoing specific example will produce what is known as a 4500° K. halophosphate having I.C.I. color coordinates of about $x=0.361$ and $y=0.370$.

As a second specific example, the following will produce a blue halophosphate having I.C.I. color coordinates of about $x=0.215$ and $y=0.268$.

*Example II*

| Phosphor constituents: | Grams |
|---|---|
| CaO | 63.6 |
| $P_2O_5$ | 54.4 |
| $Sb_2O_3$ | 1.48 |
| $CaF_2$ | 8.92 |

The foregoing phosphor raw-mix constituents may be fired in a covered crucible at a temperature of 1180° C., for example, although this first firing temperature may be varied between 1180° C. and 1260° C., the period of firing being about 3 hours, which will form a friable cake of phosphor material which will display the X-ray diffraction pattern of the natural mineral apatite. The friable cake may then be first reduced by hammer mill, as noted under Example I, and then by pebble mill to a particle size which may vary from 1.8 microns to 4.0 microns and a pebble-milling time of 7 hours will produce a phosphor having an average particle size of about 3.0 microns. These milled phosphor materials are then refired at a temperature of about 1130° C. for about 2½ hours although this second firing temperature may vary between 1100° C. and 1200° C. The milling and firing times may be varied considerably as noted under Example I. The phosphor material may then be incorporated into a "paint." This specific phosphor material may be fired over a very wide range without appreciably affecting the output.

As a further specific example, the following raw-mix constituents, on firing, will produce a warm-white halophosphate phosphor having color coordinates of about $x=0.436$ and $y=0.404$:

*Example III*

| Constituent: | Grams |
|---|---|
| CaO | 569 |
| $P_2O_5$ | 538 |
| Mn (as manganous carbonate) | 21.50 |
| $Sb_2O_3$ | 31.0 |
| $SrCl_2$ | 48.0 |
| $CaF_2$ | 77.3 |

The foregoing materials are first fired in a covered crucible at a temperature of about 1140° C. for about 3 hours, although this firing temperature may vary between 1100° C. and 1150° C., if desired. This will form a friable cake of phosphor material which is reduced to an average particle size as hereinbefore indicated under Example I and the reduced phosphor material is then refired at a temperature of from about 1050° C. to about 1100° C., for about 2½ hours, with the preferred second firing temperature being about 1090° C. The milling and firing times may be varied considerably as noted under Example I.

In all of the foregoing examples, covered crucibles have been specified for firing in order that the phosphor batch will form its own protective atmosphere, that is, in order that the phosphor batch will form a non-oxidizing atmosphere within the covered crucible. It should be understood that open crucibles for firing the phosphor batches could be used if a non-oxidizing atmosphere such as nitrogen or other inert gas, was provided within the furnace.

Any of the foregoing materials given in the specific examples are then mixed with a vehicle such as butyl acetate and with a small amount of binder material such as nitrocellulose to form a "paint," such "paint"-forming techniques being well known. As a specific example, 200 kilograms of the foregoing 4500° K. halophosphate phosphor of Example I may be mixed with 75 liters of butyl acetate and 25 liters of butyl acetate having therein 2% by weight of nitrocellulose and a No. 7 Parlin cup viscosity of 65–75 seconds. This mixture is pebble milled to form a homogeneous suspension or "paint" of very finely-divided phosphor material and this "paint" may be further thinned, if desired. The "paint" is then flushed over the inside of a fluorescent tube, after which the nitrocellulose binder is volatilized by lehring the tube at a temperature of about 650° C., for example. Previous to mixing the phosphor material with the binder and vehicle to form the "paint," the phosphor material should be crumbled to a finely-divided status to facilitate "paint forming" and hammer milling is normally effective in achieving such a finely-divided status.

In Fig. 2 is shown the effect on lamp brightness (indicated in relative brightness units) of varying the average particle size to which the phosphor material is reduced during the milling between the first and the second firing. These figures are given for a 40 w. T12 lamp and are for 100 hour performance, such 100 hour performance being accepted in the art as representative of lamp performance throughout its life. As illustrated, with a reduction in average particle size to about 7 microns, between the first and second firing, which represents the best practices of the prior art where the phosphor was merely hammer milled or pebble milled for a limited period between firings, the 100 hour brightness will be about 2458 units. The curve of brightness units vs. average particle size, after milling between the first and the second firing, is fairly level until an average particle size of about 4 microns is achieved, at which point the curve rises sharply and thereafter breaks at 3.4 microns. With still further milling, a maximum output of about 2510 to about 2515 brightness units is obtained at an average particle size of from 3.1 to 2.1 microns. At still smaller average particle sizes, the curve dips sharply, decreases rapidly after an average particle size of 1.9 microns and at 1.8 microns the ordinate value is the same as the ordinate value at 4.0 microns. The permissible average particle size which should be obtained between the first and second firing is from 4.0 to 1.8 microns, if any measurable gain over the practices of the prior art is to be achieved. Preferably the milled particle size between firings should be from 3.4 to 1.9 microns which will result in a brightness of at least 2490 units. For maximum brightness gain the average particle size effected during milling between firings should be from 3.1 microns to 2.1 microns. The lamp performance under the permissible, preferred and optimum conditions for preparing the phosphor is illustrated in Fig. 2 by means of cross hatching. It can thus be seen that a maximum increase of almost 60 brightness units has been achieved by carefully controlling the milling between firings. This works out to about a 2.4% increase in output, which is an appreciable increase in the fluorescent lamp art.

It should be noted that the relative output for different types of halophosphate phosphors, when incorporated into a lamp, will vary considerably because of the varying response of the eye to different colors. The general shape of the curve shown in Fig. 2, however, will remain substantially as shown. The values on the ordinate in Fig. 2 are given for the 4500° K. halophosphate, as specified in Example I. The performance of other phosphor materials will only change the ordinate values in Fig. 2 with the curve remaining substantially the same.

In determining the average particle size for the milled phosphor material after the first firing, it has been found convenient to use an instrument marketed by Fisher Scientific Co. of Pittsburgh, Pa., under the trademark "Sub Sieve Sizer" and such an instrument is described in Patent No. 2,261,802. In using this instrument, the phosphor true density was taken as 3.15 grams/cc. This instrument and the proposed tentative method for a standardized test are thoroughly discussed in ASTM letter dated September 23, 1955, which is a proposed outline preparatory to ASTM standardization of this instrument. This method of test was used in operating the instrument. Briefly, the Fisher "Sub Sieve Sizer" employs the air permeability method of measuring average particle size of powders and is composed of an air pump, an air pressure regulating device, a precision bore sample tube, a standardized double range air flow meter and a calculator chart. For purposes of standardization, the ASTM has recommended a sample of National Bureau of Standards cement No 114 as the primary standard and the equipment is calibrated in terms of this cement. There are various other types of equipment for determining the average particle size of finely-divided materials, but the Fisher "Sub Sieve Sizer" has been found to be quite accurate and reliable. Where average particle sizes are referred to in the foregoing methods for preparing halophosphate phosphors, the average particle sizes of the phosphor materials have been determined by the Fisher "Sub Sieve Sizer."

The halophosphate phosphor material, which has been prepared by the method as hereinbefore outlined, apparently owes much of its increased efficiency and output, when incorporated into a lamp, to the fact that the resulting phosphor materials require less milling when the "paint" is formed. In explanation, in order to disperse the phosphor materials throughout the nitrocellulose-containing butyl acetate in making the "paint," it is necessary to mill the phosphor materials along with the vehicle and binder in order to disperse completely the phosphor materials through this "paint" so that it will coat with an even texture. In setting up milling procedures on a production basis, it is the usual procedure to mill the phosphor until it is sufficiently dispersed and in such finely-divided status throughout the "paint" that the coated material will have an even and a uniform appearance. Too little milling will result in too many large particles or particle agglomerates in the coated phosphor, which will give the finished lamp a grainy appearance. Too much milling deleteriously affects the brightness of the phosphor. It is probable that much of the improvement realized by the method outlined herein is attributable to the fact that when the phosphor materials are milled down between firings to a certain limited particle size as specified and the refired, the resulting cake of phosphor material does not contain as many large particles or hard-to-reduce agglomerates of phosphor material as when the material was merely hammer milled or otherwise milled for a limited period between firings. Thus when later milling the phosphor materials in forming the "paint," it is only necessary to break up "readily-reducible" agglomerates of individual small-size crystals rather than break up large-size crystals or hard-to-reduce agglomerates. Thus less milling time is required to achieve a thorough dispersion of the very finely-divided phosphor particles throughout the "paint," which phosphor particles are sufficiently divided to give a good coating texture. It should be noted that the average particle or particle-agglomerate size of the phosphor materials which will normally give a good coating texture is about 5 microns, although this 5 micron figure may be varied somewhat. In support of this theory it should be noted that the phosphor batches which were milled after the first firing to the desired particle size as indicated herein, required approximately 40% less milling time in forming the "paint" than was required when milling the double-fired phosphors of the prior art; that is, those phosphors which were merely reduced to only a relatively large average particle size between individual firings.

The improvements realized in the halophosphate phosphor materials prepared in accordance with the methods outlined herein, are mainly realized in lamp performance tests, as opposed to so-called plaque-brightness tests wherein the phosphor material response to ultraviolet is measured without incorporating the phosphor material into a finished lamp. This is understandable in view of the mechanism proposed by which the improved method primarily operates to increase the brightness of the halophosphate phosphor, since plaque-brightness tests are normally conducted without milling the phosphor material to form the coating "paint."

Further increases in the output of the phosphor material may be achieved by other treating methods, such as washing the phosphor powder in a dilute solution of 0.1 normal nitric acid, as disclosed in copending application of Meister and Wei, Serial No. 477,932, titled: Treatment of Luminescent Materials, filed Dec. 27, 1954, and owned by the present assignee. The performance figures as given in Fig. 2 do not incorporate these additive-type of treatments for the phosphor material, and it has been found that additional treatment of the phosphor will not appreciable change the shape of the curve in Fig. 2, but will affect only the ordinate values.

It will be recognized that the objects of the invention have been achieved by providing an improved method for producing a halophosphate-type phosphor material and by providing the improved product resulting therefrom, as well as desired and optimum conditions for carrying out this improved method.

It should be noted that the phosphor materials may be reduced between firings to the desired average particle size by methods other than pebble milling, although this method is presently preferred. For example, the phosphor materials may be reduced between firings to the desired average particle size by means of a hammer mill with an air separator for removing the smaller particles as they reach the desired size, such a reducer being marketed by Pulverizing Machinery Division of Metals Disintegrating Co., Summit, N. J., under the trademark "Microatomizer."

While in accordance with the Patent Statutes one best-known embodiment of the invention has been illustrated and described in detail, it is to be particularly understood that the invention is not limited thereto or thereby.

We claim:

1. The method of preparing a calcium halophosphate phosphor material comprising, thoroughly mixing together in the desired proportions the phosphor raw-mix constituents, firing in a non-oxidizing atmosphere the mixed raw-mix constituents at such a temperature and for a sufficient time to convert the raw-mix constituents into a friable cake of phosphor material, reducing said fired phosphor material to an average particle size of from 1.8 microns to 4.0 microns, and refiring the reduced phosphor material in a non-oxidizing atmosphere at such a temperature and for a sufficient time that the reduced material again forms into a friable cake of phosphor material.

2. The method of preparing a calcium halophosphate phosphor material comprising, thoroughly mixing together in the desired proportions the phosphor raw-mix constituents, firing in a non-oxidizing atmosphere the mixed raw-mix constituents at such a temperature and for a sufficient time to convert the raw-mix constituents into a friable cake of phosphor material, reducing said fired phosphor material to an average particle size of from 1.9 microns to 3.4 microns, and refiring the reduced phosphor material in a non-oxidizing atmosphere at such a temperature and for a sufficient time that the reduced material again forms into a friable cake of phosphor material.

3. The method of preparing a calcium halophosphate phosphor material comprising, thoroughly mixing together in the desired proportions the phosphor raw-mix constituents, firing in a covered crucible the mixed raw-mix constituents at a temperature of from about 1100° C. to about 1260° C., the firing temperature and firing time being selected to convert the raw-mix constituents into a friable cake of phosphor material, reducing said fired phosphor material to an average particle size of from 1.8 microns to 4.0 microns, and refiring the reduced phosphor material in a covered crucible at a temperature of from about 1050° C. to about 1200° C. for a sufficient time that the reduced material again forms into a friable cake of phosphor material.

4. The method of preparing a calcium halophosphate phosphor material comprising thoroughly mixing together in the desired proportions the phosphor raw-mix constituents, firing in a covered crucible the mixed raw-mix constituents at a temperature of from about 1100° C. to about 1260° C., the firing temperature and firing time being selected to convert the raw-mix constituents into a friable cake of phosphor material, reducing said fired phosphor material to an average particle size of from 1.9 microns to 3.4 microns, and refiring the reduced phosphor material in a covered crucible at a temperature of from about 1050° C. to about 1200° C. for a sufficient time that the reduced material again forms into a friable cake of phosphor material.

5. The method of preparing a calcium halophosphate phosphor material comprising, thoroughly mixing together in the desired proportions the phosphor raw-mix constituents, firing in a covered crucible the mixed raw-mixed constituents at a temperature of from about 1100° C. to about 1260° C., the firing temperature and firing time being selected to convert the raw-mix constituents into a friable cake of phosphor material, reducing said fired phosphor material to an average particle size of from 2.1 microns to 3.1 microns, and refiring the reduced phosphor material in a covered crucible at a temperature of from about 1050° C. to about 1200° C. for a sufficient time that the reduced material again forms into a friable cake of phosphor material.

6. A calcium halophosphate phosphor material for fluorescent lamps, said phosphor material having been prepared by the method comprising, thoroughly mixing together in the desired proportions the phosphor raw-mix constituents, firing in a non-oxidizing atmosphere the mixed raw-mix constituents at such a temperature and for a sufficient time to convert the raw-mix constituents into a friable cake of phosphor material, reducing said fired phosphor material to an average particle size of from 1.8 microns to 4.0 microns, and refiring the reduced phosphor material in a non-oxidizing atmosphere at such a temperature and for a sufficient time that the reduced material again forms into a friable cake of phosphor material.

7. A calcium halophosphate phosphor material for fluorescent lamps, said phosphor material having been prepared by the method comprising, thoroughly mixing together in the desired proportions the phosphor raw-mix constituents, firing in a covered crucible the mixed raw-mix constituents at at emperature of from about 1100° C. to about 1260° C., the firing temperature and firing time being selected to convert the raw-mix constituents into a friable cake of phosphor material, reducing said fired phosphor material to an average particle size of from 1.9 microns to 3.4 microns, and refiring the reduced phosphor material in a covered crucible at a temperature of from about 1050° C. to about 1200° C. for a sufficient time that the reduced material again forms into a friable cake of phosphor material.

8. A calcium halophosphate phosphor material for fluorescent lamps, said phosphor material having been prepared by the method comprising, thoroughly mixing together in the desired proportions the phosphor raw-mix constituents, firing in a covered crucible the mixed raw-mix constituents at a temperature of from about 1100° C. to about 1260° C., the firing temperature and firing time being selected to convert the raw-mix constituents into a friable cake of phosphor material, reducing said fired phosphor material to an average particle size of from 2.1 microns to 3.1 microns, and refiring the reduced phosphor material in a covered crucible at a temperature of from about 1050° C. to about 1200° C. for a sufficient time that the reduced material again forms into a friable cake of phosphor material.

9. The method of preparing a halophosphate phosphor material comprising: thoroughly mixing calcium oxide, phosphorus pentoxide, manganous carbonate, antimony trioxide, strontium chloride and calcium fluoride in such proportions that the metal to phosphorus molar ratio is from 4.65/3 to 4.92/3, the halide to phosphorus molar ratio is from 1.02/6 to 1.23/6, the chloride to fluoride molar ratio is from 1:6 to 1:1, the antimony expressed as metal is from about 1% to about 4% by weight, and the manganese expressed as metal is from about 0.7% to about 0.9% by weight; firing in a nonoxidizing atmosphere the mixed raw-mix constituents at such a temperature and for a sufficient time to convert the raw-mix constituents into a friable cake of phosphor material; reducing said fired phosphor material to an average particle size of from about 2.1 microns to 3.1 microns; and refiring the reduced phosphor material in a non-oxidizing atmosphere at such temperature and for a sufficient time that the reduced material again forms into a friable cake of phosphor material.

10. The method of preparing a halophosphate phosphor material comprising: thoroughly mixing calcium oxide, phosphorus pentoxide, manganous carbonate, antimony trioxide, strontium chloride and calcium fluoride in such proportions that the metal to phosphorus molar ratio is from 4.65/3 to 4.92/3, the halide to phosphorus molar ratio is from 1.02/6 to 1.23/6, the chloride to fluoride molar ratio is from 1:6 to 1:1, the antimony expressed as metal is from about 1% to about 4% by weight, and the manganese expressed as metal is from about 0.7% to about 0.9% by weight; firing for a period of 3 hours in a non-oxidizing atmosphere at a temperature of 1185° C.; reducing said fired phosphor material to an average particle size of from 2.1 to 3.1 microns; and refiring the reduced phosphor in a non-oxidizing atmosphere at such temperature and for a sufficient time that the reduced material again forms into a friable cake of phosphor material.

11. The method of preparing a halophosphate phosphor material comprising: thoroughly mixing calcium oxide, phosphorus pentoxide, manganous carbonate, antimony trioxide, strontium chloride and calcium fluoride in such proportions that the metal to phosphorus molar ratio is from 4.65/3 to 4.92/3, the halide to phosphorus molar ratio is from 1.02/6 to 1.23/6, the chloride to fluoride molar ratio is from 1:6 to 1:1, the antimony expressed as metal is from about 1% to about 4% by weight, and the manganese expressed as metal is from about 0.7% to about 0.9% by weight; firing in a non-oxidizing atmosphere the mixed raw-mix constituents at a temperature of 1185° C. for a period of three hours; reducing said fired phosphor material in a pebble mill to an average particle size of from 2.1 microns to 3.1 microns; and refiring the reduced phosphor material in a non-oxidizing atmosphere at such a temperature and for a sufficient time that the reduced material again forms into a friable cake of phosphor material.

12. The method of preparing a halophosphate phosphor material comprising: thoroughly mixing calcium oxide, phosphorus pentoxide, manganous carbonate, antimony trioxide, strontium chloride and calcium fluoride in such proportions that the metal to phosphorus molar ratio is from 4.65/3 to 4.92/3, the halide to phosphorus molar ratio is from 1.02/6 to 1.23/6, the chloride to fluoride molar ratio is from 1:6 to 1:1, the antimony expressed as metal is from about 1% to about 4% by weight, and the manganese expressed as metal is from about 0.7% to about 0.9% by weight; firing in a non-oxidizing atmosphere the mixed raw-mix constituents at a temperature of 1185° C. for a period of three hours; reducing said fired phosphor material in a pebble mill to an average particle size of from 1.8 microns to 4.0 microns; and refiring the reduced phosphor material in a non-oxidizing atmosphere at a temperature of about 1120° C. for two and one-half hours.

13. A halophosphate phosphor material for fluorescent lamps having the general formulation $$3Ca_3(PO_4)_2 \cdot 1(CaF_2 + SrCl_2):Mn:Sb$$

wherein the metal to phosphorus molar ratio is from 4.65/3 to 4.92/3, the halide to phosphorus molar ratio is from 1.02/6 to 1.23/6, the fluoride to chloride molar ratio is from 1:1 to 1:6 and activated by from about 1% to about 4% by weight of antimony and from about 0.7% to about 0.9% by weight of manganese, said phosphor having been prepared by first firing the phosphor raw-mix constituents in a non-oxidizing atmosphere at a temperature of 1185° C. for a period of three hours, thereafter pebblemilling said first-fired phosphor material to an average particle size of from 2.1 microns to 3.1 microns, and refiring the reduced phosphor material in a non-oxidizing atmosphere at a temperature of about 1120° C. for two and one-half hours.

References Cited in the file of this patent

UNITED STATES PATENTS

| | | |
|---|---|---|
| 2,488,733 | McKeag | Nov. 22, 1949 |
| 2,579,900 | Butler | Dec. 25, 1951 |
| 2,755,254 | Butler | July 17, 1956 |
| 2,772,241 | Ranby | Nov. 27, 1956 |
| 2,826,553 | Butler | Mar. 11, 1958 |

FOREIGN PATENTS

| | | |
|---|---|---|
| 733,145 | Great Britain | July 6, 1955 |

OTHER REFERENCES

Jenkins: J. Electro Chem. Soc., July 1949, vol. 96, No. 1, page 1–12.